(12) United States Patent
Nakatani et al.

(10) Patent No.: US 10,020,090 B2
(45) Date of Patent: Jul. 10, 2018

(54) CONDUCTIVE PARTICLES, METHOD OF MANUFACTURING THE SAME, CONDUCTIVE RESIN COMPOSITION CONTAINING THE SAME, AND CONDUCTIVE COATED OBJECT

(71) Applicant: TOYO ALUMINIUM KABUSHIKI KAISHA, Osaka-shi, Osaka (JP)

(72) Inventors: Toshio Nakatani, Osaka (JP); Hideaki Minamiyama, Osaka (JP); Kazunori Koike, Osaka (JP)

(73) Assignee: TOYO ALUMINIUM KABUSHIKI KAISHA, Osaka-Shi, Osaka (JP)

( * ) Notice: Subject to any disclaimer, the term of this patent is extended or adjusted under 35 U.S.C. 154(b) by 275 days.

(21) Appl. No.: 14/780,403

(22) PCT Filed: Mar. 20, 2014

(86) PCT No.: PCT/JP2014/057815
§ 371 (c)(1),
(2) Date: Sep. 25, 2015

(87) PCT Pub. No.: WO2014/156978
PCT Pub. Date: Oct. 2, 2014

(65) Prior Publication Data
US 2016/0055931 A1    Feb. 25, 2016

(30) Foreign Application Priority Data
Mar. 28, 2013 (JP) .................... 2013-069858

(51) Int. Cl.
*B22F 1/02* (2006.01)
*H01B 1/22* (2006.01)
*C23C 18/44* (2006.01)
*C23C 18/16* (2006.01)
*C09D 1/00* (2006.01)
(Continued)

(52) U.S. Cl.
CPC ............... *H01B 1/22* (2013.01); *B22F 1/025* (2013.01); *C09D 1/00* (2013.01); *C23C 18/166* (2013.01); *C23C 18/1635* (2013.01); *C23C 18/1658* (2013.01); *C23C 18/44* (2013.01); *C23C 30/005* (2013.01); *C23F 1/14* (2013.01)

(58) Field of Classification Search
None
See application file for complete search history.

(56) References Cited

U.S. PATENT DOCUMENTS 5,178,909 A    1/1993  Hayashi
6,117,250 A    9/2000  Schemenaur et al.
2009/0096100 A1  4/2009  Kajiwara et al.

FOREIGN PATENT DOCUMENTS

JP    50-4328 B1    2/1975
JP    4-354882 A    12/1992
JP    7-90309 A     4/1995
(Continued)

*Primary Examiner* — Daniel J. Schleis
(74) *Attorney, Agent, or Firm* — Birch, Stewart, Kolasch & Birch, LLP (57) ABSTRACT

The present invention relates to conductive particles. The conductive particles contain core particles containing aluminum and a metal film covering the core particles, the metal film is higher in conductivity than the core particles, and a surface coverage of the core particles with the metal film is not lower than 80%.

7 Claims, 3 Drawing Sheets

(51) Int. Cl.
*C23C 30/00* (2006.01)
*C23F 1/14* (2006.01)

(56) References Cited

FOREIGN PATENT DOCUMENTS

| | | | |
|---|---|---|---|
| JP | 2832247 | B2 | 12/1998 |
| JP | 11-35914 | A | 2/1999 |
| JP | 2000-239865 | A | 9/2000 |
| JP | 2004-52044 | A | 2/2004 |
| JP | 2005-158317 | A | 6/2005 |
| JP | 2006-161081 | A | 6/2006 |
| JP | 2008-111175 | A | 5/2008 |
| JP | 2009-94341 | A | 4/2009 |
| JP | 2010-53436 | A | 3/2010 |
| JP | 2010053436 | * | 3/2010 |
| JP | 4662268 | B2 | 3/2011 |
| JP | 2012-79458 | A | 4/2012 |
| SU | 1666579 | A1 | 7/1991 |

* cited by examiner

CONDUCTIVE PARTICLES, METHOD OF MANUFACTURING THE SAME, CONDUCTIVE RESIN COMPOSITION CONTAINING THE SAME, AND CONDUCTIVE COATED OBJECT

TECHNICAL FIELD

The present invention relates to conductive particles, a method of manufacturing the same, a conductive resin composition containing the same, and a conductive coated object.

BACKGROUND ART

A conductive resin composition such as a conductive paste, a conductive paint, and a conductive adhesive has conventionally been employed for various applications such as electronic components and electronic circuits. Granular or flaky silver (Ag) particles and copper (Cu) particles have been known as a conductive filler used for such a conductive resin composition. Though Ag is excellent in conductivity, it is disadvantageously expensive. Cu is prone to oxidation and low in corrosion resistance, and hence it disadvantageously cannot maintain conductivity for a long period of time.

In order to address this, Japanese Patent Laying-Open No. 2008-111175 (PTD 1), Japanese Patent Laying-Open No. 2004-52044 (PTD 2), and Japanese Patent Laying-Open No. 2006-161081 (PTD 3) each have proposed a conductive filler in which surfaces of Cu particles are coated with Ag. This conductive filler is characterized by excellent conductivity, corrosion resistance, and moisture resistance. Cu, however, is high in specific gravity. Therefore, when Cu particles are employed as core particles, the conductive filler tends to precipitate in a conductive resin composition and handleability (ease in handling) thereof is disadvantageously low.

A conductive filler in which a surface of a resin low in specific gravity is coated with Ag has been developed as a technique for solving the problem of specific gravity. A resin itself to be core particles, however, has no conductivity. Therefore, in order to obtain high conductivity of this conductive filler, an amount of use of Ag should be increased, which results in high manufacturing cost.

In order to address the various problems described above, aluminum (Al) particles can be exemplified as core particles which are inexpensive, low in specific gravity, and conductive. For example, Japanese Patent Laying-Open No. 2010-53436 (PTD 4) discloses a conductive filler in which surfaces of Al particles are coated with Ag.

CITATION LIST

Patent Document

PTD 1: Japanese Patent Laying-Open No. 2008-111175
PTD 2: Japanese Patent Laying-Open No. 2004-52044
PTD 3: Japanese Patent Laying-Open No. 2006-161081
PTD 4: Japanese Patent Laying-Open No. 2010-53436

SUMMARY OF INVENTION

Technical Problem

As is clear from the figures disclosed in PTD 4, however, the conductive filler disclosed in PTD 4 has many portions where Al is exposed. Such conductive particles may not be able to exhibit expected, sufficient conductivity. When there are many portions where Al is exposed, corrosion tends to start from such portions and consequently conductivity of the conductive filler cannot sufficiently be maintained.

The present invention was made in view of the circumstances as above, and an object thereof is to provide conductive particles in which core particles containing Al are sufficiently coated with a metal film, a method of manufacturing the same, a conductive resin composition containing the same, and a conductive coated object.

Solution to Problem

The present inventors have conducted various studies for solving the problems above. Then, it has been found that Al particles tend to vigorously react with an etchant when treatment for plating Al particles is performed in a water solvent, that the Al particles tend to vigorously react also with water serving as a solvent, and that plating reaction is also excessive and the Al particles tend to be dissolved. Then, it has been found that control of aimed reaction is difficult due to such an unnecessary reaction, and consequently it is difficult to manufacture conductive particles sufficiently coated with a metal film. It has also been found that a hydrogen gas is produced along with the unnecessary reaction. Production of the hydrogen gas in a manufacturing process is not preferred in terms of safety.

Plating treatment disclosed in PTD 4 is electroless plating, which represents one of wet plating methods. A method of coating core particles with a metal includes dry plating such as vacuum vapor deposition, sputtering, ion plating, and chemical vapor deposition (CVD) and wet plating such as electroplating and electroless plating. Though dry plating is advantageous in its ability to fabricate a thin film, disadvantageously, it requires a large-scale apparatus and it is difficult to uniformly form a metal film. On the other hand, wet plating is advantageous in not requiring a large-scale apparatus as in dry plating and in its ability to treat at a time, a large amount of object to be coated such as particles.

In view of the advantages, the present inventors aimed to obtain conductive particles sufficiently coated with a metal film by solving the problems described above by not adopting dry plating but adopting electroless plating.

Then, the present inventors have reviewed electroless plating, and conceived that, in employing core particles containing Al, use of an organic solvent together with a water solvent as a reaction liquid for use in plating treatment can suppress the unnecessary reaction described above. Then, with further review based on this conception, the present invention was completed.

Namely, conductive particles according to the present invention contain core particles containing aluminum (Al) and a metal film covering the core particles, the metal film being higher in conductivity than the core particles, and a surface coverage of the core particles with the metal film being not lower than 80%.

In the conductive particles, preferably, the core particles have an average particle size not smaller than 0.1 μm and not greater than 50 μm.

In the conductive particles, preferably, the metal film contains at least one selected from the group consisting of gold (Au), silver (Ag), copper (Cu), nickel (Ni), platinum (Pt), palladium (Pd), tin (Sn), zinc (Zn), cobalt (Co), chromium (Cr), and an alloy thereof.

In the conductive particles, preferably, the metal film has a thickness not smaller than 10 nm.

In the conductive particles, preferably, an amount of the metal film covering the core particles is not lower than 1 mass % and not higher than 80 mass % in the conductive particles.

The present invention also relates to a conductive resin composition containing the conductive particles described above as a conductive material and a coated object having a coating formed of the conductive resin composition on a substrate.

A method of manufacturing conductive particles according to the present invention includes the steps of adding core particles containing Al to a mixed solvent containing an organic solvent and a water solvent, etching the core particles by adding an etchant to the mixed solvent containing the core particles, and forming a metal film higher in conductivity than the core particles on surfaces of the etched core particles by further adding metal salt and a reducing agent to the mixed solvent.

In the method of manufacturing conductive particles, preferably, the organic solvent includes at least one of an alcohol-based solvent, a glycol-ether-based solvent, and a ketone-based solvent.

In the method of manufacturing conductive particles, preferably, in the steps of etching the core particles and forming a metal film, a volume ratio of the organic solvent in the mixed solvent is not lower than 10% and not higher than 90%.

In the method of manufacturing conductive particles, preferably, in the step of forming a metal film, the mixed solvent is adjusted to a temperature not lower than 0° C. and not higher than 60° C.

Advantageous Effects of Invention

In the conductive particles, the conductive resin composition containing the same, and the conductive coated object according to the present invention, core particles containing Al are sufficiently coated with a metal film, and hence an extremely advantageous effect of excellent conductivity is exhibited. In addition, the method of manufacturing conductive particles according to the present invention allows manufacturing of conductive particles in which core particles containing Al are sufficiently coated with a metal film.

DESCRIPTION OF EMBODIMENTS

Conductive particles, a method of manufacturing conductive particles, a conductive resin composition containing the same, and a conductive coated object according to the present invention will be described hereinafter in further detail.

<<Conductive Particles>>

Conductive particles according to the present invention contain core particles containing Al and a metal film covering the core particles, the metal film is higher in conductivity than the core particles, and a surface coverage of the core particles with the metal film is not lower than 80%. Preferably, the coverage is not lower than 85%. The coverage herein means a ratio (%) of an area coated with a metal film to an area of core particles, and it can be found, for example, based on an expression (1) from analysis of an image obtained with a scanning electron microscope (SEM).

$$\text{Coverage (\%)} = \{S1/(S1+S2)\} \times 100 \qquad (1)$$

(In the expression (1), S1 represents an area of core particles coated with a metal film, and S2 represents an area of the core particles not coated with the metal film.)

The coverage herein refers to an average value of results of measurement of 50 or more particles.

In the conductive particles having characteristics above, as core particles contain Al, they are lower in specific gravity than particles composed of other metals such as Ag particles, and hence lowering in handleability due to precipitation of particles as described above can be prevented. In addition, as the core particles contain inexpensive Al, they can be provided more inexpensively than particles composed of other metals. Furthermore, since a wide region which is not lower than 80% (preferably not lower than 85%) of the surfaces of the core particles is coated with the metal film higher in conductivity than the core particles, sufficiently high conductivity can be exhibited while such advantages as inexpensiveness and low specific gravity are made use of. Moreover, since there is little Al exposed at the surface owing to the high coverage, occurrence and development of corrosion can be suppressed and consequently conductivity can sufficiently be maintained.

PTD 4 describes aluminum powders of which coverage with silver is not lower than 50% being obtained. As a result of review of the technique disclosed in PTD 4 by the present inventors, however, it has been confirmed that manufacturing of conductive particles is difficult and it is difficult to actually obtain aluminum powders of which coverage with silver is not lower than 50% (see Comparative Examples 2 and 3 below). This may be because of instability during plating treatment of Al with the use of a water solvent.

Though the conductive particles according to the present invention can be manufactured with a manufacturing method using electroless plating which will be described later, such conductive particles are different in characteristics from conductive particles manufactured with other plating methods such as electroplating or various dry plating methods. Specifically, in electroplating, since electricity is used in forming a metal film, particles tend to aggregate with one another and it is difficult to homogenously form a metal film on individual particles. With dry plating, normally, only a metal film having a thickness as small as several nm can be formed and a metal film having a thickness of several ten nm cannot be formed. In contrast, with electroless plating, since aggregation of particles with one another is less likely, a metal film can homogenously be formed on individual particles and a thickness of a metal film can freely be adjusted.

A shape of the conductive particles is not particularly restricted, and various shapes such as a spherical shape, an oval shape, a flat (flaky) shape, a gourd shape, and a polyhedral shape can be exemplified. In particular, from a point of view of ease in plating owing to a small specific surface area, a spherical shape is preferred. The spherical shape herein does not intend a mathematically spherical shape but refers to a shape which can apparently be determined as spherical.

The conductive particles have an average particle size preferably not smaller than 0.1 μm and not greater than 50 μm and more preferably not smaller than 1 μm and not greater than 40 μm. When the average particle size is smaller than 0.1 μm, handleability lowers. For example, workability may significantly lower in manufacturing a conductive resin composition by mixing conductive particles with a resin. When the average particle size exceeds 50 μm as well, handleability lowers. For example, when a coated object is made by application to a substrate, smoothness of a surface of the coated object may be impaired. The average particle size in the present invention refers to a volume average particle size found by calculating a volume average based on particle size distribution measured with a known particle size distribution analysis method such as laser diffraction.

An amount of a metal film covering the core particles in the conductive particles is preferably not lower than 1 mass % and not higher than 80 mass % in the conductive particles and more preferably not lower than 10 mass % and not higher than 60 mass %. When the amount of the metal film covering the core particles in the conductive particles is lower than 1 mass % in the conductive particles, the metal film is excessively small in thickness and hence conductivity of the conductive particles cannot sufficiently be high. When the amount exceeds 80 mass % in the conductive particles, an amount of metal attributed to the metal film is excessively large and hence cost is high, which is not preferred. Mass % of the metal film which covers surfaces of the core particles in the conductive particles (an amount of the metal film occupied in the conductive particles) can be determined with a known method which can measure a mass of a metal, such as atomic absorption spectrophotometry.

From a point of view of design quality, the conductive particles have an L* value preferably not smaller than 30, more preferably not smaller than 40, and further preferably not smaller than 60. The L* value represents a luminosity under CIE 1976 in the CIE 1976 L*a*b* color space (CIELAB). A greater numeric value indicates a brighter tone, to which an L* value shown under JIS Z8729 corresponds. Supplementary illuminant C defined under JIS Z8720 was employed as a colorimetry illuminant.

The conductive particles according to the present invention may contain an inevitable impurity or may contain other optional components so long as they exhibit the effect of the present invention.

<Core Particles>

The core particles form cores of the conductive particles according to the present invention and contain Al. Specifically, the core particles may consist of Al or may be composed of an aluminum alloy. Examples of the aluminum alloy include an alloy composed of Al which is a main metal and at least one selected from silicon (Si), magnesium (Mg), and a transition metal. In particular, from a point of view of ease in industrial production and availability, the core particles preferably consist of Al.

A shape of the core particles is not particularly restricted, and various shapes such as a spherical shape, an oval shape, a flat (flaky) shape, a gourd shape, and a polyhedral shape can be exemplified. In particular, from a point of view of ease in plating owing to a small specific surface area, a spherical shape is preferred. The spherical core particles are also advantageous in availability because manufacturing with inert gas spraying or nitrogen gas spraying is easy.

The core particles have an average particle size preferably not smaller than 0.1 μm and not greater than 50 μm. When the average particle size is smaller than 0.1 μm, manufacturing is difficult, and in addition, with tendency of aggregation of particles, handleability lowers, which is not practical. When the average particle size exceeds unfavorably, such a problem as non-uniform dispersion or lowering in coverage capability at the time of blend with a resin may arise.

For example, powders obtained with known atomization, crushing, a rotating disk method, a rotating electrode method, cavitation, or melt spinning can be employed as such core particles. Alternatively, a product obtained by deforming powders obtained with such a method into a flat shape through physical working may be employed. In particular, from a point of view of manufacturing cost and uniformity, powders obtained with atomization are preferably employed as core particles.

The core particles according to the present invention may contain an inevitable impurity. So long as the effect of the present invention is exhibited, a purity (%) of Al or an Al alloy forming the core particles is not particularly restricted, however, from a point of view of conductivity, the purity is preferably not lower than 92.5%.

<Metal Film>

The metal film covers 80% or more (preferably 85% or more) of surfaces of the core particles and is higher in conductivity than the core particles. This metal film preferably contains at least one selected from the group consisting of Au, Ag, Cu, Ni, Pt, Pd, Sn, Zn, Co, Cr, and an alloy thereof. From a point of view of handleability and ease in preparation of a sample, the metal film preferably consists of one type of metal. In particular, from a point of view of conductivity and cost, a metal film composed of Ag is preferred.

The metal film has a thickness preferably not smaller than 10 nm and not greater than 350 nm. When the core particles have a spherical shape, the metal film has a thickness more preferably not smaller than 30 nm and not greater than 100 nm and further preferably not smaller than 50 nm and not greater than 100 nm. When the core particles have a flaky shape, the metal film has a thickness more preferably not smaller than 10 nm and not greater than 100 nm. When the metal film has a thickness smaller than 10 nm, the conductive particles cannot have sufficiently high conductivity. When the metal film has a thickness exceeding 350 nm, particles tend to aggregate, which is not preferred. When the metal film has a thickness not smaller than 50 nm, the coverage can further be improved.

A thickness of the metal film can be determined, for example, by observing a cross-section of any 20 conductive particles with a scanning electron microscope, measuring a thickness at 5 portions of the metal film for each particle, calculating an arithmetic mean value thereof, and defining the arithmetic mean value as an average thickness.

The metal film according to the present invention may contain an inevitable impurity. So long as the effect of the present invention is exhibited, a purity of a metal forming the metal film is not particularly restricted. From a point of view of conductivity and plastic workability, however, the purity is preferably not lower than 92.5%.

As described above in detail, the conductive particles according to the present invention can have sufficiently high conductivity while the advantages of the core particles which are inexpensive and low in specific gravity are made use of. In addition, since there are few portions where Al is exposed at the surface, occurrence and development of corrosion can be suppressed and consequently conductivity can sufficiently be maintained. Therefore, the conductive particles according to the present invention exhibit an extremely advantageous effect of excellent conductivity.

<<Conductive Resin Composition>>

The present invention also relates to a conductive resin composition containing the conductive particles as a conductive material. The conductive particles according to the present invention solve the problem and the conductive resin composition containing the conductive particles as the conductive material can take over the effect of the conductive particles described above. Namely, according to the conductive composition in the present invention, precipitation of the conductive particles in the conductive resin composition is suppressed and consequently high handleability can be achieved. In addition, the conductive resin composition according to the present invention can have high conductivity, and not only it can maintain conductivity but also it can be provided inexpensively.

Specifically, the conductive resin composition is obtained by dispersing the conductive particles in a resin, and examples thereof include a conductive paste, a conductive paint, a conductive adhesive, a conductive ink, and a conductive film. Such a conductive resin composition can be manufactured, for example, by kneading the conductive particles into a resin.

A conventionally known resin used for an application of this type can be employed as the resin. Examples of the resin include thermosetting acrylic resin/melamine resin, thermosetting acrylic resin/cellulose acetate butyrate (CAB)/melamine resin, thermosetting polyester (alkyd) resin/melamine resin, thermosetting polyester (alkyd)/CAB/melamine resin, isocyanate curing urethane resin/ambient curing acrylic resin, and water-diluted acrylic emulsion/melamine resin.

Though a content of the conductive particles in the conductive resin composition is different depending on an application and not particularly limited, the content is, for example, preferably not less than 10 parts by mass and not more than 100 parts by mass with respect to 100 parts by mass of resin. When the content is less than 10 parts by mass, conductivity of the conductive resin composition may be insufficient. When the content exceeds 100 parts by mass, an amount of the conductive particles in the conductive resin composition is excessive, which may result in lower handleability. The conductive composition may contain an optional component other than the resin and the conductive particles. Examples of the optional component include glass frit, metal alkoxide, a viscosity preparation agent, and a surface preparation agent.

<<Conductive Coated Object>>

The present invention also relates to a coated object having a coating formed of the conductive resin composition on a substrate. The conductive resin composition according to the present invention can take over the effect of the conductive particles according to the present invention as described above, and therefore, the coated object having the coating formed of this conductive resin composition on the substrate can also take over the effect of the conductive particles according to the present invention.

Examples of the conductive coated object specifically include a conductive coating, an electrode, a wire, a circuit, a conductive joint structure, and a conductive adhesive tape. A shape and a thickness of the coating are not particularly restricted either, and a desired thickness can be adopted depending on an application thereof.

A material for a substrate is not particularly limited and includes a metal, an organic substance such as plastic, an inorganic substance such as ceramics and glass, paper, and lumber.

A conventionally known application method can be adopted as a method of applying the conductive composition according to the present invention onto a substrate without being particularly limited, and any method can be adopted.

<<Method of Manufacturing Conductive Particles>>

The method of manufacturing conductive particles according to the present invention includes the steps of adding core particles containing Al to a mixed solvent containing an organic solvent and a water solvent, etching the core particles by adding an etchant to the mixed solvent containing the core particles, and forming a metal film higher in conductivity than the core particles on surfaces of the etched core particles by further adding metal salt and a reducing agent to the mixed solvent. Each step in the present invention will be described below in detail.

<Adding Step>

The present step is the step of adding the core particles containing Al to a mixed solvent containing an organic solvent and a water solvent.

According to the present step, the core particles to be cores of the conductive particles can be dispersed in advance in a mixed solvent to be a reaction solution for plating treatment.

The core particles containing Al may have contamination such as fat and grease adhered thereto, and in this case, prior to treatment with a reaction liquid consisting of a water solvent, pre-treatment such as degreasing and cleaning of the core particles has been required. In contrast, according to the present invention, since the core particles are added to a mixed solvent containing an organic solvent and a water solvent, contamination such as fat and grease adhering to the core particles is removed from the surfaces of the core particles by the organic solvent. Therefore, according to the present invention, pre-treatment which has conventionally been required can be omitted and hence manufacturing cost can be reduced.

In the present step, the mixed solvent is preferably agitated. Thus, since the core particles can more uniformly be dispersed in the mixed solvent, each treatment in each subsequent step can efficiently be performed in a stable manner. Any known method may be employed as an agitation method, and for example, an agitator such as a jet agitator or a high-shear mixer or ultrasound can be employed. More uniform dispersion can be achieved in a short period of time based on combination thereof.

Since preferred features of the core particles such as a composition, a shape, and a manufacturing method are the same as those of the core particles in the conductive particles described above, description thereof will not be repeated.

A mixed solvent contains an organic solvent and a water solvent, and may contain other components such as an ionic liquid so long as etching reaction and plating reaction in each subsequent step are not interfered. From a point of view of manufacturing cost, however, the mixed solvent preferably consists of an organic solvent and a water solvent.

Though the organic solvent is not particularly limited, an organic solvent having high affinity with water is preferred, and in particular, the organic solvent more preferably contains at least one of an alcohol-based solvent, a glycol-ether-based solvent, and a ketone-based solvent. Addition of particles composed of Al as the core particles to a water solvent as in a conventional example accompanies such an unnecessary reaction that Al and water vigorously react with each other, and hence control of reaction in a subsequent step has disadvantageously been difficult. In contrast, in the present step, the core particles are added to the mixed solvent composed of the organic solvent and the water solvent and hence an unnecessary reaction as in the conventional example can be suppressed. When an organic solvent having high affinity with water is employed as the organic solvent, such an organic solvent has polarity and hence it is higher in miscibility (affinity) with a water solvent than other organic solvents. Therefore, a mixed solvent containing such an organic solvent and a water solvent is less likely to suffer from separation and can readily keep a mixed state. Thus, each treatment in each subsequent step can be performed in a stable manner.

Examples of a preferred alcohol-based solvent can include methyl alcohol, ethyl alcohol, isopropyl alcohol, n-propyl alcohol, t-butyl alcohol, n-butyl alcohol, and isobutyl alcohol. Examples of a preferred glycol-ether-based solvent can include ethylene glycol monoethyl ether, ethylene glycol monobutyl ether, propylene glycol monobutyl ether, and dipropylene glycol monomethyl ether. Examples of a preferred ketone-based solvent can include acetone and methyl ethyl ketone. A water solvent is not particularly restricted and may be any water such as industrial water, purified water, ion exchanged water, and ultrapure water. From a point of view of an ability to suppress formation of a precipitate of metal ions with ions in a water solvent, however, ion exchanged water is preferred.

Though a volume ratio of an organic solvent in a mixed solvent is not particularly restricted in the present step, the volume ratio is preferably adjusted in the present step such that the volume ratio can readily be adjusted within a range which will be described later in the steps of etching and forming a metal film which will be described later.

<Etching Step>

The present step is the step of etching the core particles by adding an etchant to the mixed solvent containing the core particles.

Since the core particles contain Al as described above, an oxide film is present on the surface thereof. When a metal film is formed without removing this oxide film, conductive particles having high conductivity cannot be obtained because the oxide film is insulating. In contrast, according to the present invention, prior to formation of the metal film, initially, the core particles are etched in the present step. Thus, the oxide film present on the surfaces of the core particles can be removed.

Since the conventional method of performing plating treatment in a water solvent as described previously accompanies such an unnecessary reaction that Al and an etchant excessively vigorously react with each other and Al and water vigorously react with each other, control of an aimed reaction has disadvantageously been difficult. In contrast, according to the present invention, Al is etched in the mixed solvent containing the organic solvent and the water solvent. Thus, the unnecessary reaction as described above can be suppressed and hence the oxide film present on the surfaces of the core particles can sufficiently be removed and excessive etching of the core particles can be suppressed.

So long as an etchant can be dissolved or dispersed in a mixed solvent, an acid or a base used for conventional Al etching can be employed. Any of an organic acid, an inorganic acid, and salt thereof may be employed as the acid. Examples of a preferred organic acid can include citric acid, succinic acid, malic acid, oxalic acid, and ascorbic acid, examples of a preferred inorganic acid can include hydrochloric acid, sulfuric acid, boric acid, and phosphoric acid, and examples of salt of the organic acid and the inorganic acid can include sodium salt and potassium salt. Examples of a preferred base can include sodium hydroxide, potassium hydroxide, and ammonia water. In particular, in adjusting pH of a mixed solvent to be alkaline in the step of forming a metal film which will be described later, from a point of view of facilitation of this adjustment, a base is preferably employed.

A complexing agent may further be added to the mixed solvent. The complexing agent serves to form a complex with Al in order to suppress reprecipitation of etched Al. Specifically, carboxylic acid such as succinic acid, oxycarboxylic acid such as citric acid and tartaric acid, glycine, ethylenediaminetetraacetic acid (EDTA), aminoacetic acid, and salt thereof such as alkali metal salt and ammonium salt can be employed. Since reprecipitation of Al can be suppressed by employing such a complexing agent in the present step, stable etching can be achieved.

A volume ratio of the organic solvent in the mixed solvent in the present step, that is, a mixed solvent to which such an additive as an etchant has been added, is preferably not lower than 10% and not higher than 90% and more preferably not lower than 30% and not higher than 70%. By setting the volume ratio to 10% or higher, unnecessary etching brought about by excessive reaction between Al and the etchant can sufficiently be suppressed. By setting the volume ratio to 90% or lower, insufficient etching due to excessive suppression of etching reaction can sufficiently be avoided. By setting the volume ratio to 30% or higher and 70% or lower, the effect above can further efficiently be exhibited, and in addition the volume ratio in the step of forming a metal film which will be described later can readily be adjusted to a prescribed volume ratio.

A treatment time period in the present step is preferably not shorter than 10 seconds and not longer than 120 seconds. When the treatment time period is shorter than 10 seconds, etching is insufficient, which leads to insufficient removal of the oxide film on the surfaces of the core particles, and consequently it tends to be difficult to obtain conductive particles having high conductivity. When the treatment time period exceeds 120 seconds, etching is excessive, which leads to reaction between the etchant and the core particles, and hence generation of a reaction product such as hydroxide is likely. Since this reaction product becomes a factor for interfering the step of forming a metal film which will be described later, it consequently tends to be difficult to obtain conductive particles having high conductivity.

In the present step as well, the mixed solvent to which the core particles and the etchant have been added is preferably agitated. Since the core particles and the etchant are thus uniformly dispersed in the mixed solvent, the core particles can efficiently be etched.

<Step of Forming Metal Film>

The present step is the step of forming a metal film higher in conductivity than the core particles on the surfaces of the etched core particles by further adding metal salt and a reducing agent to the mixed solvent, that is, the step of performing plating treatment.

The effect according to the present step will be described in comparison with the conventional technique. Initially, as described previously, since the conventional method of performing plating treatment in a water solvent accompanies such an unnecessary reaction that Al and an etchant excessively vigorously react with each other and Al and water vigorously react with each other, control of an aimed reaction is difficult. Consequently, disadvantageously, the core particles cannot sufficiently be coated. In contrast, according to the present step, a metal film is formed in a mixed solvent containing an organic solvent and a water solvent. Thus, the unnecessary reaction as described above can be suppressed and hence the conductive particles high in conductivity sufficiently coated with a metal film can be manufactured.

Conventionally, in some cases, when the core particles from which an oxide film has been etched away are moved to a next plating treatment solution, the core particles are taken out of an etching solution and exposed to atmosphere, which has led to formation again of an oxide film on the surfaces of the core particles. In contrast, according to the present step, since metal salt and a reducing agent necessary for plating treatment are further added to the mixed solvent containing the etchant, the core particles are not exposed to atmosphere. Therefore, formation again of the oxide film on the etched core particles is prevented and then the metal film can be formed. Thus, lowering in conductivity due to the presence of the oxide film can be suppressed and hence the conductive particles high in conductivity sufficiently coated with the metal film can be manufactured at high yield.

Conventionally, in some cases, when etching of the core particles and formation of the metal film are performed simultaneously in a single treatment solution, a metal forming the metal film has started to precipitate in a partial etched region of the surfaces of the core particles. In this case, a local battery is formed in the region where the metal has precipitated. With this formation of a local electrode, a local Al solution reaction is promoted, which makes control of a solution reaction complicated and difficult, and consequently a homogenous metal film could not be formed. In contrast, according to the present invention, the step of forming a metal film is performed after the etching step. Thus, the problems above can be solved and hence the conductive particles high in conductivity sufficiently coated with the metal film can be manufactured at high yield.

The metal salt employed in the present step can preferably be dissolved in a stable manner in a mixed solvent containing an organic solvent and a water solvent, and nitrate, sulfate, nitrite, oxalate, carbonate, chloride, acetate, lactate, sulfamate, fluoride, iodide, and cyanide can be employed.

A metal contained in the metal salt is transformed into a metal forming the metal film through the present step. This metal is higher in conductivity than the core particles, and in particular, it is preferably selected from the group consisting of Au, Ag, Cu, Ni, Pt, Pd, Sn, Zn, Co, Cr, and an alloy thereof. Since these metals and alloy are sufficiently higher in conductivity than the core particles, aimed conductive particles having high conductivity can be manufactured.

When Au, Ag, or Pt among these is employed, the effect of the present invention is further noticeable for the following reasons. With the conventional electroless plating using a water solvent, a difference between a standard electrode potential of Al forming the core particles and each standard electrode potential of Au, Ag, and Pt is particularly great, and hence it has particularly tended to be difficult to uniformly form a metal film composed of any of these metals. In contrast, when electroless plating is performed in a mixed solvent in the present step, conductive particles having sufficient coating with the metal film can be manufactured even with the use of these metals. Among others, from a point of view of conductivity and cost, Ag is preferably employed.

The reducing agent reduces a metal generated from metal salt in a mixed solvent and precipitates the metal on surfaces of the core particles. Specifically, sugars such as glucose and saccharose, polysaccharides such as cellulose, starch, and glycogen, polyalcohols such as ethylene glycol, propylene glycol, and glycerol, hypophosphorous acid, formaldehyde, boron hydride, dimethylamine borane, trimethylamine borane, and hydrazine tartrate can be employed. Hydrazine tartrate is preferably alkali metal salt.

A complexing agent may further be added to a mixed solvent. The complexing agent serves to form a complex with Al in order to suppress reprecipitation of generated Al. Specifically, carboxylic acid such as succinic acid, oxycarboxylic acid such as citric acid and tartaric acid, glycine, ethylenediaminetetraacetic acid (EDTA), aminoacetic acid, and salt thereof such as alkali metal salt and ammonium salt can be employed. Since reprecipitation of Al can be suppressed by employing such a complexing agent in the present step, the metal film can be grown in a stable manner.

A volume ratio of the organic solvent in the mixed solvent in the present step, that is, a mixed solvent to which such an additive as metal salt and a reducing agent has been added, is preferably not lower than 10% and not higher than 90% and more preferably not lower than 30% and not higher than 70%. When the volume ratio is lower than 10%, an excessive plating reaction cannot sufficiently be suppressed and Al may unduly be dissolved. When the volume ratio exceeds 90%, a necessary plating reaction may be suppressed. By setting the volume ratio to 30% or higher and 70% or lower, a degree of a plating reaction can more suitably be adjusted.

When a metal film composed of Ag is formed in the present step, in particular, pH of the mixed solvent to which an additive has been added is preferably adjusted to be alkaline and more preferably adjusted to 8 or higher and 12 or lower. This is because it is easier to control an Ag plating reaction under an alkali condition than under an acid condition. pH of the mixed solvent can be adjusted also based on an amount of addition of the reducing agent and the complexing agent described above, and can readily be adjusted also by adding sodium hydroxide, potassium hydroxide, or ammonia water to the mixed solvent.

In the present step, the mixed solvent is adjusted to a temperature preferably not lower than 0° C. and not higher than 60° C., more preferably not lower than 5° C. and not higher than 50° C., and further preferably not lower than 10° C. and not higher than 35° C. When the temperature of the mixed solvent is lower than 0° C., a rate of formation of the metal film is excessively low, which is inefficient. When the temperature of the mixed solvent exceeds 60° C., a rate of formation is excessively high and it becomes difficult to form a uniform metal film.

A treatment time period in the present step is preferably not shorter than 15 minutes and not longer than 120 minutes and more preferably not shorter than 30 minutes and not longer than 90 minutes. When the treatment time period is shorter than 15 minutes, a plating reaction is insufficient and an amount of coating of the core particles is lower than 80% in some cases. When the treatment time period exceeds 120 minutes, an unnecessary reaction in the mixed solvent proceeds and the mixed solvent may be gelated.

The mixed solvent is preferably agitated also in the present step. Thus, since the core particles and other components are uniformly dispersed in the mixed solvent, aggregation of the core particles with one another can be suppressed, an aimed reaction can uniformly take place in the mixed solvent, and hence the metal film can efficiently be formed on the surfaces of the core particles.

<Other Steps>

The method of manufacturing conductive particles according to the present invention can include other steps so long as each step above is performed. Other steps include, for example, the step of cleaning the core particles before adding the core particles to the mixed solvent and taking the manufactured conductive particles out of the mixed solvent.

As described above in detail, according to the manufacturing method in the present invention, the oxide film on the surfaces of the core particles containing aluminum is etched away while an unnecessary reaction is suppressed, and the metal film can be formed on that surface in a stable manner while the unnecessary reaction is continually suppressed. Therefore, consequently, control of a reaction in formation of the metal film is facilitated and hence conductive particles in which the core particles are sufficiently coated with the metal film can be manufactured.

Specifically, according to the manufacturing method in the present invention, conductive particles of which surface coverage of the core particles with the metal film is not lower than 80% can be manufactured. The conductive particles thus exhibiting high coverage can have high conductivity originating from a metal forming the metal film. When a conductive resin composition containing the manufactured conductive particles as a conductive material is prepared, for example, by employing the core particles containing aluminum low in specific gravity, precipitation thereof can be suppressed as compared with other conductive particles such as conductive particles consisting of silver. Therefore, consequently, handleability is excellent. Furthermore, cost for manufacturing conductive particles can be reduced by using core particles containing aluminum which is inexpensively available.

Though electroless plating is employed in the manufacturing method according to the present invention, manufactured conductive particles are different from conductive particles manufactured with other manufacturing methods such as electroplating and dry plating in the following point. In electroplating, since electricity is used in forming a metal film, particles tend to aggregate with one another and it is difficult to homogenously form a metal film on individual particles. With dry plating, normally, only a metal film having a thickness as small as several nm can be formed and a metal film having a thickness of several ten nm cannot be formed. In contrast, with electroless plating, since aggregation of particles with one another is less likely, a metal film can homogenously be formed on individual particles and a thickness of a metal film can freely be adjusted.

As described above in detail, the method of manufacturing conductive particles according to the present invention can allow manufacturing of the conductive particles described above, that is, the conductive particles including the core particles containing Al and the metal film covering the core particles, the metal film being higher in conductivity than the core particles, and the surface coverage of the core particles with the metal film being not lower than 80%.

Plating employed in the present invention is electroless plating representing one of wet plating methods. Therefore, as compared with dry plating, a large-scale apparatus is not required and a large amount of conductive particles can be manufactured at a time.

EXAMPLES

Though the present invention will be described below in further detail with reference to Examples, the present invention is not limited thereto.

Study 1

Example 1

1. Preparation of Materials

Materials below were prepared.

Al powders (having an average particle size of 5 µm, manufactured by Toyo Aluminium K. K.) in a shape from spherical to granular were employed as core particles. A mixture of 50 l of isopropyl alcohol (IPA) and 200 l of ion exchanged water was employed as the mixed solvent. An etching solution obtained by mixing 566 g of sodium hydroxide with IPA and adjusted to 10 l was employed as the etchant. This etching solution also functions as a pH adjuster. A silver nitrate aqueous solution obtained by adding 1415 g of silver nitrate to 6.4 l of ammonia water and adjusted to 10 l with ion exchanged water was employed as the metal salt and the complexing agent. Namely, silver nitrate contained in the silver nitrate aqueous solution functions as the metal salt and ammonia functions as the complexing agent. A reducing agent solution obtained by mixing 4.3 kg of glucose with IPA and adjusted to 10 l was employed as the reducing agent.

2. Manufacturing of Conductive Particles

Initially, 2 kg of Al powders was added to the mixed solvent and the mixed solvent was agitated with the use of a clamping jet agitator. The core particles were thus dispersed in the mixed solvent (the "adding step"). Then, the core particles were etched by adding 1.75 l of the etching solution to this mixed solvent and continuing agitation for 90 seconds (the "etching step"). Successively, 8.25 l of the remaining etching solution, 10 l of the silver nitrate aqueous solution, and 10 l of the reducing agent solution were added to this mixed solvent. Then, plating treatment was performed by carrying out agitation for 30 minutes, with a temperature of this mixed solvent being adjusted to 27° C. (the "step of forming a metal film").

After the treatment above, slurry generated in the mixed solvent was filtered out and the resultant slurry was cleaned with ion exchanged water and methanol. The cleaned slurry was dried in a vacuum environment at 130° C. Thus, silver-coated aluminum particles in which Al particles representing the core particles were coated with a film composed of Ag were obtained as the conductive particles.

Example 2

1. Preparation of Materials

Al powders (having an average particle size of 6 µm, manufactured by Toyo Aluminium K. K.) in a shape from spherical to granular were employed as core particles. A mixture of 1 l of IPA, 1 l of n-butyl alcohol, and 3.4 l of ion exchanged water was employed as the mixed solvent. An etching solution obtained by mixing 189 g of sodium hydroxide with IPA and adjusted to 1.4 l was employed as the etchant. This etching solution also functions as a pH adjuster. A silver nitrate aqueous solution obtained by adding 472.4 g of silver nitrate to 2.1 l of ammonia water and adjusted to 2.5 l was employed as the metal salt and the complexing agent. Namely, silver nitrate contained in the silver nitrate aqueous solution functions as the metal salt and ammonia functions as the complexing agent. A reducing agent solution obtained by mixing 710 g of glucose with n-butyl alcohol and adjusted to 1.4 l was employed as the reducing agent.

2. Manufacturing of Conductive Particles

Initially, 700 g of Al powders was added to the mixed solvent and the mixed solvent was agitated with the use of a clamping jet agitator and dispersed with the use of ultrasound. Ultrasound dispersion was carried out with the use of an ultrasound cleaning machine. The core particles were thus dispersed in the mixed solvent (the "adding step"). Then, the core particles were etched by adding 15 ml of the etching solution to this mixed solvent and continuing agitation for 30 seconds (the "etching step"). Successively, 2.5 l of the silver nitrate aqueous solution and 1.4 l of the reducing agent solution were added to this mixed solvent. Then, plating treatment was performed by carrying out agitation for 60 minutes, with a temperature of this mixed solvent being adjusted to 30° C. (the "step of forming a metal film").

After the treatment above, slurry generated in the mixed solvent was filtered out and the resultant slurry was cleaned with ion exchanged water and methanol. The cleaned slurry was dried in a vacuum environment at 130° C. Thus, silver-coated aluminum particles in which Al particles representing the core particles were coated with a film composed of Ag were obtained as the conductive particles.

Example 3

1. Preparation of Materials

Materials below were prepared.
Al powders (having an average particle size of 33 μm, manufactured by Toyo Aluminium K. K.) in a shape from spherical to granular were employed as core particles. A mixture of 80 l of IPA and 170 l of ion exchanged water was employed as the mixed solvent. An etching solution obtained by mixing 553 g of sodium hydroxide with propylene glycol monopropyl ether and adjusted to 10 l was employed as the etchant. This etching solution also functions as a pH adjuster. A silver nitrate aqueous solution obtained by adding 1381 g of silver nitrate to 6.2 l of ammonia water and adjusted to 10 l with ion exchanged water was employed as the metal salt and the complexing agent. Namely, silver nitrate contained in the silver nitrate aqueous solution functions as the metal salt and ammonia functions as the complexing agent. A reducing agent solution obtained by mixing 8.3 kg of glucose with propylene glycol monopropyl ether and adjusted to 10 l was employed as the reducing agent.

2. Manufacturing of Conductive Particles

Initially, 3.3 kg of Al powders was added to the mixed solvent and the mixed solvent was agitated with the use of a high-shear mixer. The core particles were thus dispersed in the mixed solvent (the "adding step"). Then, the core particles were etched by adding 1 l of the etching solution to this mixed solvent and continuing agitation for 120 seconds (the "etching step"). Successively, 9 l of the remaining etching solution, 10 l of the silver nitrate aqueous solution, and 10 l of the reducing agent solution were added to this mixed solvent. Then, plating treatment was performed by carrying out agitation for 45 minutes, with a temperature of this mixed solvent being adjusted to 43° C. (the "step of forming a metal film").

After the treatment above, slurry generated in the mixed solvent was filtered out and the resultant slurry was cleaned with ion exchanged water and methanol. The cleaned slurry was dried in a vacuum environment at 130° C. Thus, silver-coated aluminum particles in which Al particles representing the core particles were coated with a film composed of Ag were obtained as the conductive particles.

Example 4

1. Preparation of Materials

Materials below were prepared.
Al powders (having an average particle size of 2.3 μm, manufactured by Toyo Aluminium K. K.) in a shape from spherical to granular were employed as core particles. A mixture of 7 l of ethyl alcohol and 2.5 l of ion exchanged water was employed as the mixed solvent. An etching solution obtained by mixing 320 g of sodium hydroxide with IPA and adjusted to 2.3 l was employed as the etchant. This etching solution also functions as a pH adjuster. A silver nitrate aqueous solution obtained by adding 800 g of silver nitrate to 2.0 l of ammonia water and adjusted to 2.3 l with ion exchanged water was employed as the metal salt and the complexing agent. Namely, silver nitrate contained in the silver nitrate aqueous solution functions as the metal salt and ammonia functions as the complexing agent. A reducing agent solution obtained by mixing 1.2 kg of glucose with ethyl alcohol and adjusted to 2.3 l was employed as the reducing agent.

2. Manufacturing of Conductive Particles

Initially, 500 g of Al powders was added to the mixed solvent and the mixed solvent was agitated with the use of a clamping jet agitator. The core particles were thus dispersed in the mixed solvent (the "adding step"). Then, the core particles were etched by adding 180 ml of the etching solution to this mixed solvent and continuing agitation for 90 seconds (the "etching step"). Successively, 2.1 l of the remaining etching solution, 2.3 l of the silver nitrate aqueous solution, and 2.3 l of the reducing agent solution were added to this mixed solvent. Then, plating treatment was performed by carrying out agitation for 30 minutes, with a temperature of this mixed solvent being adjusted to 3° C. (the "step of forming a metal film").

After the treatment above, slurry generated in the mixed solvent was filtered out and the resultant slurry was cleaned with ion exchanged water and methanol. The cleaned slurry was dried in a vacuum environment at 130° C. Thus, silver-coated aluminum particles in which Al particles representing the core particles were coated with a film composed of Ag were obtained as the conductive particles.

Comparative Example 1

Comparative Example 1 was the same as Example 1 except for use of 250 l of IPA instead of the mixed solvent as the material. For manufacturing the conductive particles, silver-coated aluminum particles were manufactured with the method the same as in Example 1.

Comparative Example 2

Comparative Example 2 was the same as Example 2 except for use of 5.4 l of ion exchanged water instead of the mixed solvent as the material. For manufacturing the conductive particles, the method the same as in Example 2 was performed.

Comparative Example 3

Comparative Example 3 was the same as Example 3 except for use of 250 l of ion exchanged water instead of the mixed solvent as the material. For manufacturing the conductive particles, the method the same as in Example 3 was performed.

<Amount of Coating with Metal Film>

An amount of coating with the metal film (mass %) in the conductive particles in each Example and each Comparative Example was found.

Specifically, initially, each sample obtained by dissolving conductive particles in an acid solution was prepared. For each sample, a metal component contained in the conductive particles was measured with an atomic absorption spectrophotometer (a product name: "A-2000" manufactured by Hitachi High-Tech Fielding Corporation). Then, a mass ratio of Al/Ag was calculated based on a result of this measurement, and an average amount of coating in the conductive particles (mass %) was calculated based on the mass ratio in accordance with an expression (2) below. Table 1 shows results. A sample obtained by taking an appropriate amount of conductive particles, thereafter dissolving the conductive particles in a mixed acid composed of nitric acid and hydrofluoric acid at a room temperature with approximately 30 minutes being spent, and diluting the solution to a concentration suitable for measurement was employed as each sample. A wavelength for measurement was set to 328.1 nm and a gas condition was set as air-acetylene.

$$\text{Amount of Coating (mass \%)} = \{W1/(W1+W2)\} \times 100 \quad (2)$$

(In the expression (2), W1 represents a mass of a metal (Ag) forming the metal film and W2 represents a mass of a metal (Al) forming the core particles.)

TABLE 1

|  | Amount of Coating (Mass %) | Coverage (%) | Average Particle Size (μm) | Thickness of Metal Film (nm) |
|---|---|---|---|---|
| Example 1 | 31.9 | 86 | 6.3 | 100 |
| Example 2 | 27.6 | 90 | 6.8 | 80 |
| Example 3 | 20.5 | 93 | 34.1 | 330 |
| Example 4 | 48.4 | 90 | 3.7 | 75 |
| Comparative Example 1 | 28.8 | 47 | 13.5 | 20 |
| Comparative Example 2 | — | — | — | — |
| Comparative Example 3 | — | — | — | — |

<Coverage with Metal Film>

A coverage (%) in the conductive particles with the metal film in each Example and each Comparative Example was found.

Figure 1:
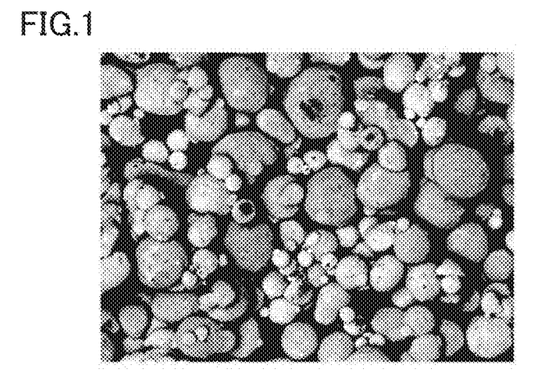
FIG. 1 is a backscattered electron image (at a magnification of 3000×) of a sample made of conductive particles in Example 1.

Specifically, initially, each sample in which the conductive particles were dispersed over a carbon tape was prepared. Then, a backscattered electron image of each sample was photographed under conditions of an acceleration voltage of 5 kV and a measurement magnification of 3000× with the use of a scanning electron microscope (a product name: "JSM-5510" manufactured by JEOL Ltd.). FIG. 1 shows a backscattered electron image (at a magnification of 3000×) of a sample made of the conductive particles in Example 1. In FIG. 1, a region which appears to be granular corresponds to the conductive particles, and a region which appears to be black in a gap among the conductive particles corresponds to the carbon tape.

Figure 2:
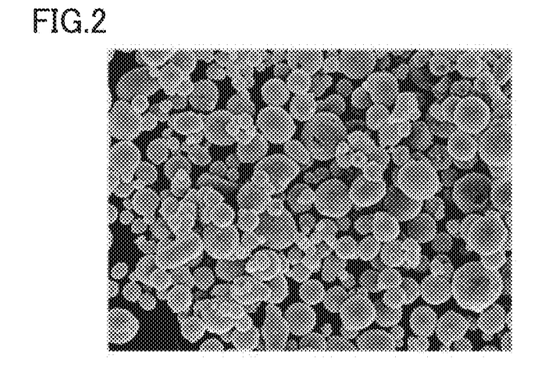
FIG. 2 is a secondary electron image (at a magnification of 2000×) of the sample made of the conductive particles in Example 1.
Figure 3:
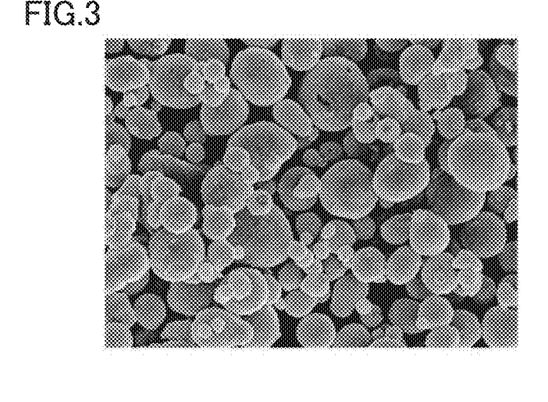
FIG. 3 is a secondary electron image (at a magnification of 3000×) of the sample made of the conductive particles in Example 1.
Figure 4:
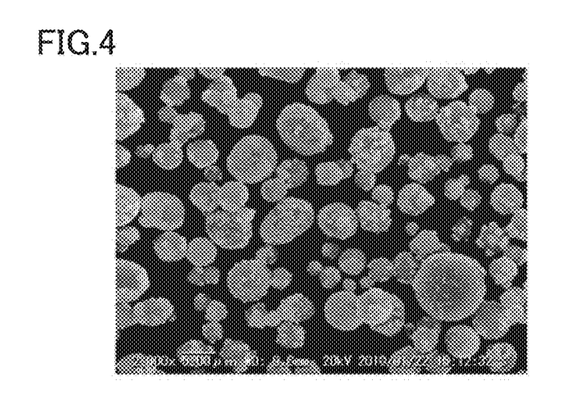
FIG. 4 is a secondary electron image (at a magnification of 2000×) of a sample made of conductive particles in Comparative Example 1.
Figure 5:
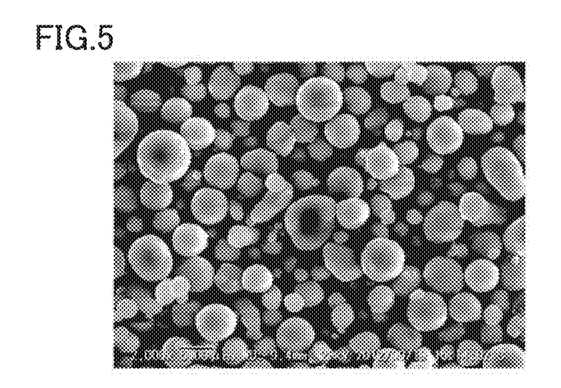
FIG. 5 is a secondary electron image (at a magnification of 2000×) of a sample made of aluminum particles.

For reference, FIG. 2 shows a secondary electron image (at a magnification of 2000×) of the sample made of the conductive particles in Example 1, FIG. 3 shows a secondary electron image (at a magnification of 3000×) of the sample made of the conductive particles in Example 1, FIG. 4 shows a secondary electron image (at a magnification of 2000×) of a sample made of the conductive particles in Comparative Example 1, and FIG. 5 shows a secondary electron image (at a magnification of 2000×) of a sample made of aluminum particles. It was observed in FIGS. 2 and 3 that the surfaces of the conductive particles in Example 1 were relatively smooth and homogenously coated with the metal film. It was observed in FIG. 4 that the metal film was non-uniformly scattered over the surfaces of the conductive particles in Comparative Example 1. In FIG. 4, a substance adhering to the conductive particles and making the surface thereof rough corresponds to the metal film.

Referring back to FIG. 1, the photographed backscattered electron image was subjected to processing in (1) to (3) below with the use of image processing software (a product name; "Photoshop®", Adobe Systems Inc.), and thus a coverage (%) of the conductive particles with the metal film was calculated. The "coverage (%)" in Table 2 represents an average coverage of 50 or more conductive particles.

Figure 6:
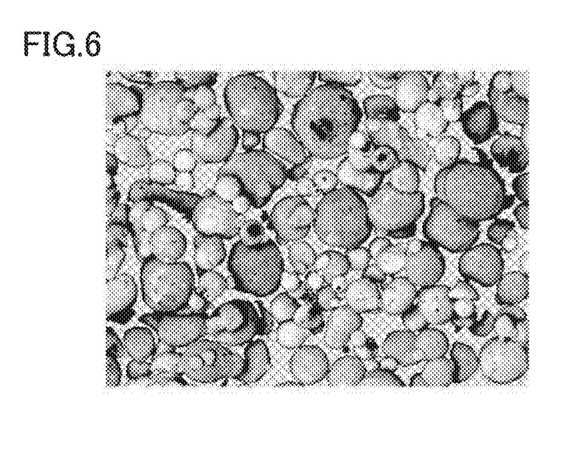
FIG. 6 is a diagram showing an image obtained by removing a region where no particles are present from the backscattered electron image in FIG. 1.

(1) A portion of the backscattered electron image (FIG. 1) where no particles are present (a region where the carbon tape appears) is deleted. FIG. 6 shows the backscattered electron image in FIG. 1 from which the region where no particles are present has been deleted, and a region in a checkered pattern seen among the conductive particles in FIG. 6 corresponds to the deleted region.

Figure 7:
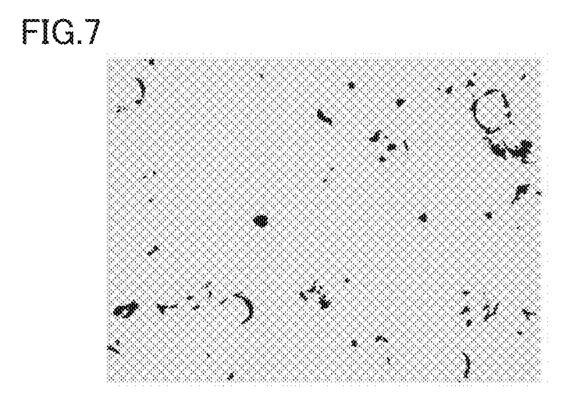
FIG. 7 is a diagram showing an image which has been subjected to monochrome binarization processing.

(2) The remaining region (a region other than the checkered pattern) in FIG. 6 is subjected to monochrome binarization processing. FIG. 7 shows an image subjected to monochrome binarization processing. The region of the checkered pattern corresponds to the region deleted in (1) and to a region determined to have a white (level=1) attribute in monochrome binarization processing, and the region other than the checkered pattern corresponds to a region determined to have a black (level=0) attribute in monochrome binarization processing. The region determined to have the black attribute in the monochrome binarization processing in FIG. 6 corresponds to a region in the conductive particles where Al is exposed, and the region determined to have the white attribute corresponds to a region in the conductive particles coated with Ag.

(3) A coverage (%) is calculated by substituting the number of image bits (A) having the black (level=0) attribute in FIG. 7, that is, the number of image bits of the region other than the checkered pattern in FIG. 7, and the number of image bits (B) of the entire image in FIG. 6, that is, the number of image bits of the region other than the checkered pattern in FIG. 6, into an expression of $\{B-A)/B\} \times 100$.

An image including 50 or more particles was employed for the backscattered electron image. When 50 or more particles are not included in a single image at the time of observation, a plurality of images were prepared by varying a field of view of observation and were combined for use.

<Thickness of Metal Film>

A thickness of the metal film was found by observing a cross-section of any 20 conductive particles with the use of a scanning electron microscope (a product name: "JSM-5510" manufactured by JEOL Ltd.), measuring a thickness at 5 portions of the metal film for each particle, calculating an arithmetic mean value thereof, and defining the arithmetic mean value as an average thickness.

<Particle Size of Conductive Particles>

An average particle size of the conductive particles in each Example and each Comparative Example was found.

Specifically, initially, a sample was fabricated by adding 0.4 g of powders (an aggregate of particles) made of the conductive particles to a sample bath containing 50 ml of methanol, and this sample was subjected to ultrasonic dispersion (15 W) for 1 minute. Then, the sample bath immediately after dispersion was subjected to measurement of distribution of a particle size with the use of a laser diffraction/scattering particle size distribution analyzer (a product name: "LA-300" manufactured by Horiba, Ltd.) to thereby measure a D50 particle size in particle size distribution of a volume average. Thus, an average particle size was calculated.

<Evaluation>

As is clear from Table 2 in connection with a coverage with a metal, it was found that the conductive particles in each Example manufactured with the mixed solvent composed of the organic solvent and the water solvent achieved a coverage with the metal not lower than 80%. In contrast, the conductive particles in Comparative Example 1 manufactured with the organic solvent achieved a low coverage with the metal not higher than 50%.

With attention being paid to Examples 2 and 3, in spite of the fact that they were smaller in amount of coating (mass %) with the metal film than Comparative Example 1, the coverage (%) not lower than 80% was exhibited. It is estimated from this fact that, by using the mixed solvent, a reaction is appropriately controlled in each step and a metal film having a more uniform thickness is thus formed on the entire surfaces of the core particles.

As is clear from Table 1 in connection with the average particle size, the average particle size of the conductive particles in Comparative Example 1 was at least twice as large as the average particle size of the conductive particles in Example 1, and it corresponds to a value at least twice as large as the particle size of the employed Al powders. On the other hand, the amount of coating (mass %) with the metal film was greater in Example 1. Normally, it is unlikely that, with the amount of coating (mass %) as much as the amount shown in Table 1, the average particle size of the conductive particles is at least twice as large as the particle size of the Al powders representing a source material. Therefore, it is estimated that the conductive particles in Comparative Example 1 were the aggregate of particles.

In Comparative Examples 2 and 3, conductive particles could not be manufactured because the water solvent and the Al powders vigorously reacted with each other in the manufacturing step and the Al powders were dissolved and gelated. Therefore, it is expected that formation of a metal film on surfaces of the Al powders with the use of the water solvent is difficult, and even if a metal film could be manufactured, manufacturing conditions would extremely be limited and manufactured conductive particles could not hold constant quality.

Study 2

<Formation of Coating>

A coating was formed with the use of the conductive particles manufactured in each of Examples 1 to 4 and Comparative Example 1. Each coating was fabricated such that a volume ratio of the conductive particles was 60%.

Specifically, in connection with Examples 1 and 2 and Comparative Example 1, a coating was formed by applying a mixture of 3 g of silver-coated aluminum powders and 3 g of a resin solution (a trade name: "Nippe Acryl Auto Clear Super" manufactured by Nippon Paint Co., Ltd.) onto a PET film with the use of an applicator such that a dried coating had a thickness of 30 μm, and drying the mixture at 100° C. for 30 minutes.

In connection with Example 3, a coating was formed by applying a mixture of 2.73 g of the silver-coated aluminum powders and 3 g of the resin solution (the same as above) onto a PET film with the use of an applicator such that a dried coating had a thickness of 100 μm and drying the mixture at 100° C. for 30 minutes.

In connection with Example 4, a coating was formed by applying a mixture of 3.7 g of the silver-coated aluminum powders and 3 g of the resin solution (the same as above) onto a PET film with the use of an applicator such that a dried coating had a thickness of 30 μm and drying the mixture at 100° C. for 30 minutes.

A volume ratio of the conductive particles in the coating can be calculated in accordance with a calculation expression below.

Volume ratio (%)={[mass (g) of conductive particles/specific gravity (g/cm$^3$) of conductive particles]/[(mass (g) of resin solution×ratio of solvent (%) in resin solution/specific gravity (g/cm$^3$) of resin solution)+(mass (g) of conductive particles×specific gravity (g/cm$^3$) of conductive particles]}×100 (ratio (%) of solvent in resin solution being 32%)

A thickness of the coating was confirmed through measurement with a digimatic standard outside micrometer (a trade name: "IP65 COOLANT PROOF Micrometer" manufactured by Mitutoyo Corporation).

<Resistivity>

Measurement was conducted at any 5 points of each coating with the use of a four-probe surface resistivity meter (a trade name: "Loresta GP" manufactured by Mitsubishi Chemical Analytech Co., Ltd.) and an average value was defined as a resistivity value (Ω·cm). Specifically, a value obtained by entering data on a dimension of a conductive coating, an average thickness of the coating, and a coordinate of a measurement point in the four-probe surface resistivity meter and having the meter carry out automatic calculation was defined as a resistivity value of the conductive coating. Table 2 shows results. A smaller value for resistivity indicates excellent conductivity.

TABLE 2

|  | Resistivity (Ω · cm) | L* Value |
| --- | --- | --- |
| Example 1 | $1.8 \times 10^{-3}$ | 64.1 |
| Example 2 | $1.4 \times 10^{-3}$ | 76.6 |
| Example 3 | $5.0 \times 10^{-3}$ | 58.0 |
| Example 4 | $2.0 \times 10^{-3}$ | 69.8 |
| Comparative Example 1 | Measurement not Available | 33.2 |

<L* Value> An L* value representing a luminosity defined under JIS-Z8729 was obtained from a Y value measured in accordance with the method described in a condition a under JIS-Z8722 for each coating. Specifically, measurement was conducted with the use of a multi-angle spectrophotometer (a trade name: "X-Rite MA-6811" manufactured by X-Rite Inc.) at a measurement angle of 45 degrees. Table 2 shows results. A higher L value indicates a higher degree of whiteness.

<Evaluation>

Regarding resistivity, Comparative Example 1 was insufficient in coating with the metal film. Therefore, a constant current could not flow at the time of measurement and measurement could not be conducted. In contrast, Examples 1 to 4 exhibited sufficiently low resistivity. It was confirmed from this fact that the coating containing the conductive particles in Examples 1 to 4 had high conductivity.

It could be confirmed in connection with the L* value that, in the coating in Examples 1 to 4, metal-coated aluminum powders were better in tone than Comparative Example 1. This may be because a coating metal uniformly precipitated on Al powders. It was found from this result that when the metal film in the conductive particles according to the present invention is composed of Ag, the L* value was not smaller than 30 or not smaller than 40. It was considered that this value would be one factor for determining whether or not the conductive particles were according to the present invention.

Though the embodiment and the examples of the present invention have been described above, combination of features in each embodiment and example described above as appropriate is also originally intended.

It should be understood that the embodiment and the examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. Conductive particles, comprising:
   core particles containing aluminum; and
   a metal film covering said core particles,
   said metal film being higher in conductivity than said core particles,
   a surface coverage of said core particles with said metal film being not lower than 80%, and
   said conductive particles having an L* value not smaller than 40.

2. The conductive particles according to claim 1, wherein said core particles have an average particle size not smaller than 0.1 µm and not greater than 50 µm.

3. The conductive particles according to claim 1, wherein said metal film contains at least one selected from the group consisting of gold, silver, copper, nickel, platinum, palladium, tin, zinc, cobalt, chromium, and an alloy thereof.

4. The conductive particles according to claim 1, wherein said metal film has a thickness not smaller than 10 nm.

5. The conductive particles according to claim 1, wherein an amount of the metal film covering said core particles is not lower than 1 mass % and not higher than 80 mass % in said conductive particles.

6. A conductive resin composition comprising the conductive particles according to claim 1 as a conductive material.

7. A coated object having a coating formed of the conductive resin composition according to claim 6 on a substrate.

* * * * *